UNITED STATES PATENT OFFICE.

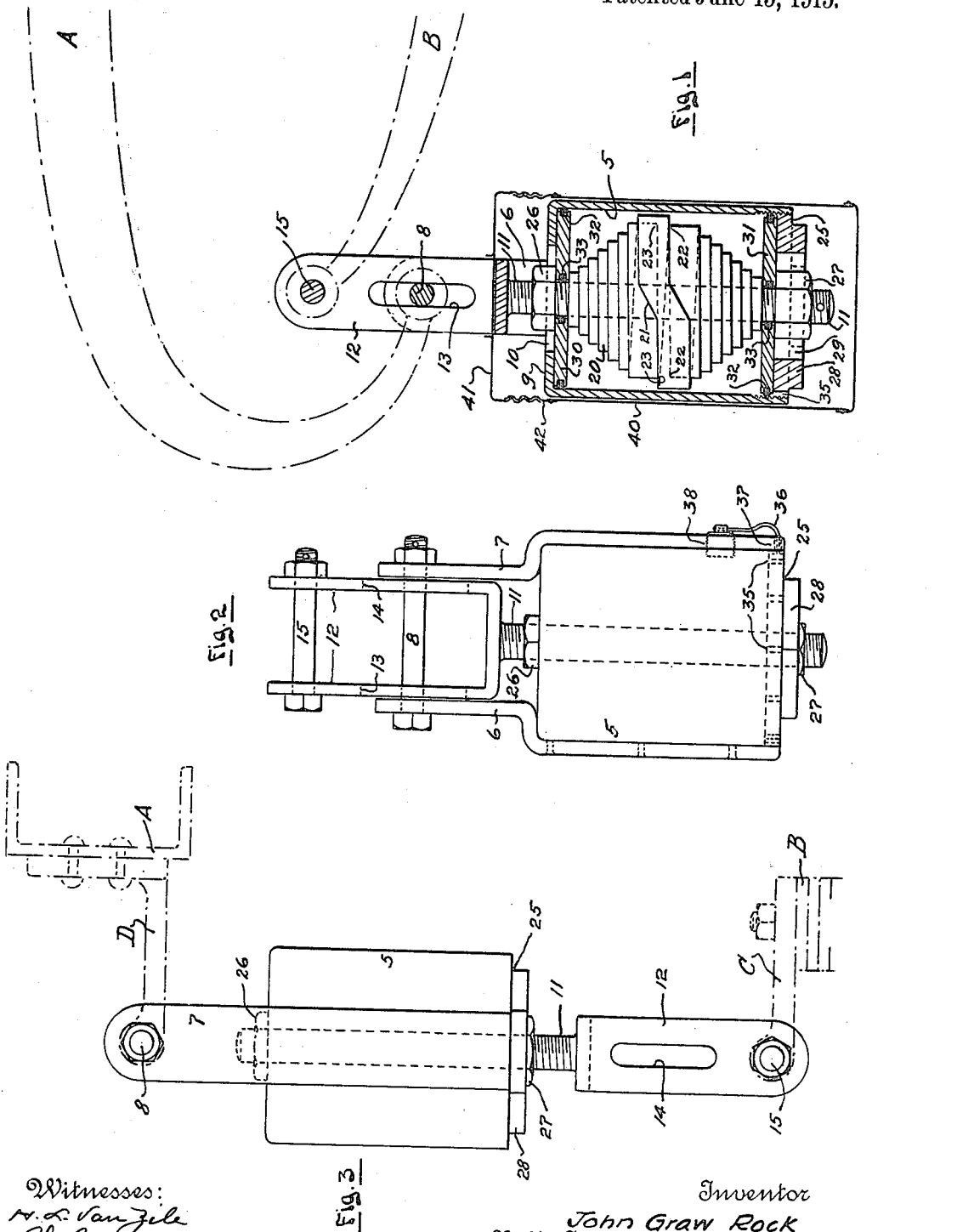

JOHN GRAW ROCK, OF NEW ROCHELLE, NEW YORK, ASSIGNOR TO FREDERICK W. CLARK, OF MOUNT VERNON, NEW YORK.

SHOCK-ABSORBER.

1,143,068.   Specification of Letters Patent.   Patented June 15, 1915.

Application filed December 19, 1912, Serial No. 737,665. Renewed June 24, 1914. Serial No. 847,141.

*To all whom it may concern:*

Be it known that I, JOHN GRAW ROCK, a citizen of Norway, and resident of the city of New Rochelle, in the county of Westchester and State of New York, have invented certain new and useful Improvements in Shock-Absorbers, of which the following is a specification.

This invention relates particularly to a shock absorber adapted for interposition between the body and supporting structure of a vehicle, and more especially between the chassis and elliptical springs of an automobile.

One of the objects of the invention is the production of a shock-absorber suitable for such application in which all vertical stresses, whether up or down, operate to compress the spring of the shock-absorber, thus avoiding the usual and less desirable alternating compression and tension effects.

Another object is to improve the action of the buffer spring by housing it in a grease container, which is also a part of the mechanism for applying the vertical stresses to the spring.

Still another object is to produce a shock-absorber which is reversible so that it may be connected either between the chassis and the end of the elliptical spring or between the chassis and axle of an automobile.

A further object is to provide the device with an improved buffer spring of what is known as the double pyramidal volute type, the spring being provided at its central coil with an offset to prevent adjacent convolutions from abutting when the spring is compressed by relative movement of the vehicle parts.

In general, the object is to provide a simple, effective, housed structure capable of being manufactured at low cost and easy of application to the vehicle.

Other objects and advantages will become apparent as the description proceeds.

With these objects in view the invention comprises the improvements and combinations of parts hereinafter described and pointed out in the appended claims reference being had to the accompanying drawings which form a part of this specification.

In the said drawings illustrating the invention in its preferred embodiment: Figure 1 is a sectional elevation of the device; Fig. 2 is a side view of Fig. 1; and Fig. 3 is a front view of the device, parts being shown in a changed position.

In these views, the numeral "5" represents a cylindrical casing having upwardly projecting spaced arms 6, 7 connected by a bolt 8, which is passed through the end of the horn extension of the side channel iron A of the automobile chassis. A screw threaded rod or member 11 passes vertically through the casing and has a fork 12 at one end, which may be slidably guided between the arms 6, 7 as shown in Fig. 2. The arms of the fork 12 are slotted at 13, 14 to accommodate the bolt 8 and permit relative vertical movement, and they are connected at their ends by a bolt 15 which is passed through the end of the elliptical vehicle spring B.

A compression spring 20 is housed inside the casing 5 and is acted upon by the casing and the rod 11, which constitute relatively movable parts attached to the body and supporting structure of an automobile, respectively. Movement of either of these parts relatively to the other, in either direction compresses the spring. To this end each of said parts, the casing and the rod, has abutments to bear upon both ends of the spring. In the instance of the casing the abutments are the upper end or head 9 and the adjustable lower head or screw plug 25 which may be annular as shown. The abutments carried by the rod are conveniently in the form of two nuts 26, 27. At the top of the abutments 9 and 26 bear upon the spring. At the bottom 25 and 27 act likewise. That is to say the spring is confined between 9 and 26 at the top and 25 and 27 at the bottom.

Washers 30 and 31 are interposed between both sets of abutments and the ends of the spring. Said washers are in slidable guiding relation both with the casing 5 and the rod 11. They make a tight sliding fit with the grease containing casing 5, and to this end the washers are provided both externally and internally with suitable packing rings 32, 33 set into annular grooves in the washers.

The screw plug 25 has a polygonal portion 28 for engagement by a wrench to adjust it up or down. Both the end head 9 and the plug 25 have central openings 10 and 29 respectively of sufficient size to permit turning of the nuts 26, 27.

In operation if the running gear moves upward relatively to the car body, the fork 12 and rod 11 are raised relatively to the casing 5. This moves the nut abutments 26, 27 upwardly. The upper end of the spring 20 cannot follow the nut abutment 26, because it is held by the head abutment 9 of the casing. The lower end of the spring is raised by the nut abutment 27 away from the other casing or plug abutment 25; and consequently the spring is compressed. If the part B moves downward the operation is obviously reversed, but the spring 20 is again compressed, this time because the nut abutment 26 approaches the other abutment 25. Similarly, it will be found that movement of the casing either up or down, due to movement of the vehicle body compresses the spring 20.

It will be understood that the spring is normally under compression and that its compression is increased by relative vertical movement of the vehicle attached parts. At least one of the abutments of each part is adjustable, so that both sets of abutments can be adjusted to bear upon the spring. Preferably, the parts are adjusted so that under normal conditions both the abutments 9 and 26 at one end are in contact with the washer 30 which bears against one end of the spring, while both the abutments 25 and 27 at the other end similarly contact with the washer 31. However, it will be obvious that the adjustment may be such that the spring is normally confined between an abutment of one part and an abutment of the other part, the other abutments being out of contact with the washers and consequently not bearing upon the spring. This will be the case if the vehicle carries an excess load or an underload. Of the casing abutments the plug 25 is adjustable. The opposite end 9 might also be adjustable, but it is not necessary. Of the rod abutments both the nuts 26 and 27 are shown adjustable. This is desirable because it enables the device as a whole to be adjusted vertically.

The fork 12 and bolt 15 and the arms 6, 7 with the bolt 8 attach the two relatively movable parts of the device flexibly to the car and spring of the vehicle, and thus allow for relative fore and aft movement. The screw plug 25 also enables the spring to be placed in and removed from the casing. To keep the said plug from turning it is provided with peripheral notches 35, one of which is engaged by the end of a spring 36 that passes through an opening 37 in the parts 5 and 7. The other end of this spring passes through a transverse aperture in a filling plug 38 so as to keep both plugs from turning except when the spring 36 is released from the notch 35. The said filling plug 38 which enables grease to be introduced into the container casing 5, is in threaded engagement with an opening in the parts 5 and 7.

A detachable outer shell 40 of leather or other suitable material is placed around the container so as to catch any grease that may escape from the latter. This shell or drip holder is preferably composed of two parts, the lower longer part 40, which surrounds the casing 5, being also provided with a threaded neck 42. A cap 41 which constitutes the upper part of said holder, is perforated to allow the casing arms 6, 7 and the fork arms 12 to pass therethrough, being supported on the flat or horizontal portion of the latter. The said cap 41 is correspondingly threaded so as to detachably connect it with the lower part of the shell 40. These parts are large enough to admit of relative movement between the casing and the fork 12 with the rod 11 extending therefrom.

As shown in Fig. 3, the rod 11 and fork 12 are reversible, so that the fork may be attached to the axle or the central part of the spring B, a suitable bracket C being provided for the purpose. In this event the arms 6, 7 of the casing 5 are conveniently secured to a bracket D attached to the side bar A of the chassis frame.

The spring 20 is of the double pyramidal volute type, and is made of one piece of flat spring stock. The central coil of the spring is offset at 21 so as to space adjacent convolutions, thus permitting the spring to be compressed to a considerable extent without causing the edges of the convolutions 22 and 23 to abut against each other.

Having described my invention what I desire to secure by Letters Patent and claim is:—

1. A shock-absorber, comprising a casing formed with a head at one end constituting an upper abutment, a pair of arms secured closely to the sides of said casing, said arms being offset inwardly over the casing head and extended upward to constitute an attachment to one part of a vehicle, an annular plug entering the other end of said casing constituting a lower abutment, washers bearing respectively against said upper and said lower abutments, a spring interposed between said washers, a threaded stem passing through said washers and said spring, nuts on said stem adjusted to bear each upon one of said washers, a fork at one end of said stem adapted for attachment to another part of the vehicle and slidable between the offset portions of the arms of said casing and means for connecting said arms and said fork to their respective vehicle parts.

2. A shock-absorber comprising a casing, a rod passing therethrough, a compression spring in the casing, washers at opposite ends of said spring, said washers being provided with exterior and interior grooves, packing rings set in said grooves to make a tight sliding fit with said casing and said rod, said casing having abutments at opposite ends to bear upon said washers, one of the abutments being in the nature of an annular plug adjustable relatively to the opposite abutment, and said rod having also abutments to bear upon opposite sides of the washers the latter abutments being in the nature of nuts adjustable relatively to each other and to the abutments on the casing.

3. A shock-absorber, comprising a compression spring, a casing therefor having abutments to bear upon opposite ends of the spring, one of them being in the nature of a screw plug, a member passing through the casing and also having abutments to bear upon opposite ends of the spring, a filling plug for the casing, and means coöperating both with said abutment plug and said filling plug to keep them from turning.

4. A shock-absorber comprising a compression spring, a casing therefor constituting a grease container and having abutments adjustable one relatively to the other to bear upon opposite ends of the spring, an attachment to one part of the vehicle extending from said casing, a second attachment for another part of the vehicle passing through said casing and movable relatively thereto and having also adjustable abutments to bear upon opposite ends of said spring, a two part outer shell or drip holder inclosing said casing, one part of said holder being supported on said second attachment while permitting relative movement of said first attachment thereto, and means for detachably connecting the parts of said drip holder.

5. A shock absorber comprising a casing having arms for attachment to one part of a vehicle, a rod having an integral forked-connection for attachment to another part of the vehicle, said rod and fork being adapted to enter said casing reversibly from either end thereof, a compression spring in the casing through which the rod passes, and interrelatively adjustable abutments on both the casing and the rod adapted to bear upon each end of the same spring.

6. A shock absorber comprising a casing having at one end means for attachment to one part of a vehicle, a rod extending into said casing and also having at the same end means for attachment to another part of a vehicle, and a double acting pyramidal volute spring located within said casing and surrounding said rod, both the inward and outward movements of each of said means relatively to the other compressing and therefore being cushioned by the same spring.

7. A shock absorber comprising a casing having at one end spaced arms for attachment to one part of a vehicle, a rod within said casing and having at the same end spaced arms for attachment to another part of a vehicle, vehicle attaching means extending through both pair of said spaced arms whereby said arms have a sliding movement one relatively to the other, a double acting pyramidal volute spring located within said casing and surrounding said rod, both the inward and outward movements of each of said spaced arms relatively to the other compressing and therefore being cushioned by the same spring, and adjustable spring engaging means at one end of the rod.

Signed at the borough of Manhattan in the county of New York and State of New York this 17th day of December A. D. 1912.

JOHN GRAW ROCK.

Witnesses:
H. C. KARLSON,
W. H. GEE.

Copies of this patent may be obtained for five cents each, by addressing the "Commissioner of Patents, Washington, D. C."